United States Patent Office 2,800,403
Patented July 23, 1957

2,800,403

MOLDED ABRASIVE AND METHOD FOR PRODUCING IT

William J. W. Bosler, Philadelphia, Pa., and Howard L. Harvey, Haddonfield, N. J., assignors to American Viscose Corporation, Philadelphia, Pa., a corporation of Delaware No Drawing. Application November 12, 1953, Serial No. 391,712

12 Claims. (Cl. 51—298)

This invention relates to improved molded abrasive articles, such as abrasive wheels or discs, and to methods of producing them.

In the production of molded abrasive articles heretofore, various fillers have been used including inorganic particulate fillers and fibrous inorganic and organic fillers. In accordance with the present invention, it has been discovered that molded abrasive articles are greatly increased in impact resistance and flexural strengths when the fillers are largely or entirely replaced with a chopped fabric filler. Fabric facings have been placed on molded abrasive articles and laminated abrasive articles have been produced with fabric layers provided therein. However, in accordance with the present invention, a chopped fabric filler is thoroughly mixed with the resin and abrasive grain or grits in such a manner that the final molded article contains pieces of the chopped fabric heterogeneously arranged so that the threads in the fabric extend haphazardly in all directions here and there within the body of the article, thereby reinforcing the article in all directions.

In general, the procedure of the present invention involves initially wetting the abrasive grits with a liquid heat-reactive phenolic condensation product whereby the grits become coated with or encased with the phenolic condensation product. Such condensation products are those of phenol, cresol or other phenolic substances with aldehydes, such as formaldehyde, acetaldehyde or the like, and the liquid condensation product is that commonly referred to as the product of the A-stage. For example, the single-stage alkali-catalyzed liquid phenol-formaldehyde condensates may be used advantageously. At least 2 parts by weight of the liquid condensate per 100 parts by weight of grits should be used and as much as 10 parts by weight may be used. Preferably, about 6 to 7 parts by weight are used per 100 parts of grit to provide thorough wetting of the grits when the common grades thereof are used. If coarser grits are used, a smaller proportion of the liquid condensate may be applied whereas when extremely fine grits are being treated, a larger proportion of the condensate is desirable. The mixing of the condensate with the grits may be performed in a suitable mixer such as those of the Troy or the Hobart types.

After the phenolic condensate has been thoroughly mixed into the grits so as to wet their surfaces substantially, additional thermosetting, heat-reactive resin or resin-forming material is added and the chopped rag filler may be added simultaneously, previously or subsequently, the additional resin and the filler being thoroughly mixed with the wetted grits. The additional resin may be added as a powder. When the filler is to be incorporated simultaneously with the additional resin or resin-forming material, it may be impregnated with the additional resin or part of it, with the resin-forming component or components or with a preliminary condensate of such components adapted to form the resin, and thereafter the impregnated filler is partially or completely dried and disintegrated into granules or particles of the desired size. For example, large pieces of fabric may be impregnated with a solution of a resin or a resin-forming precondensate, and after drying, it may be disintegrated or chopped down to the desired state of sub-division.

The additional resinous material may be a phenol-aldehyde resin of the same or of a different composition, as compared to that with which the grits is initially wetted. It may, however, be of an entirely different resin or resin-forming material such as condensation products of furfural itself, furfural with phenol, polyvinyl alcohol with formaldehyde or other aldehydes, urea-formaldehyde resin, thiourea formaldehyde resin, ureathiourea formaldehyde resin, unmodified alkyd resins of the glycerol pathalic acid type and amine-aldehyde resin-modified alkyd resins, cresylic acid-modified phenol-formaldehyde resins, aromatic amine-aldehyde resins, such as aniline-formaldhyde resins, condensation products of melamine and is derivatives such as 2.4.6 triethyl and triphenyl triamino 1.3.5 triazines, 2.4.6 trihydrazino 1.3.5 triazine and the corresponding condensed triazines such as melam and melem with aldehydes and especially formaldehyde. Mixtures of the various condensation products may be used. For example, a mixture of a furfural condensation product with phenol formaldehyde condensation products or of triazine aldehyde condensation products, such as melamine-formaldehyde resins, with phenol formaldehyde may be used. Such mixed resins are preferably prepared by reacting a mixture of the aldehyde with the two or more other components which react with the aldehyde.

The regular filler may be derived from various fibrous materials such as cotton, wool, silk, regenerated cellulose, cellulose acetate, cellulose ethers such as hydroxyethyl cellulose, nylon, vinyl resins having high melting points or of infusible type such as polyacrylonitrile or copolymers of acrylonitrile having at least 75% acrylonitrile combined with one or more other monomers such as vinyl chloride, vinyl acetate and vinyl pyridine, methacrylonitrile and so on. Preferably, the filler is cellulosic, such as cotton or regenerated cellulose. Besides the chopped rag filler, there may be additional filler material such as clay, asbestos fibers, glass particles or fibers, mica, mineral wool, cotton fibers or other natural or vegetable fibers but at least 9/10 of the entire filler (the term filler excluding the abrasive grits) comprising the chopped rag component thereof. Such chopped rag filler contains threads comprising twisted filaments or fibers, as threads or yarns, as well as pieces or chunks of rags, generally woven, which may vary in size from 1/25 square inch to one inch square or more in dimension and are generally of irregular shape. The pieces of chopped rag filler are haphazardly arrayed in the body of the molded product. Such filler reinforces the molded product in all directions and thereby increases the flexural and impact strengths markedly as compared to the ordinary particulate or fibrous fillers. The total amount of filler may be used in a proportion as low as 3 parts by weight of filler per 100 parts of grits to as high as 50 parts by weight of filler per 100 parts of grits, the increase in strength being proportional to the amount of filler incorporated.

As pointed out, the additional resin or resin-forming material and the filler comprising the chopped rag filler may be added separately in either order or simultaneously but it is preferred to impregnate the filler with the resin-forming material or condensate before adding it to the grits wetted with the phenolic condensate. This may be accomplished by carrying out the condensation in the presence of the filler and drying or by impregnating the filler with a solution of a preliminary condensation product or of the resin-forming material or materials. Illustratively, the filler may be impregnated with the resin or resin-forming condensate in such proportions as to provide 35 to 65% filler and, conversely, 65 to 35% resin, a 50–50 mixture being especially useful.

Other materials besides the abrasive grits, the resin and the rag filler may be incorporated up to as much as 5 to 10 parts by weight per 100 parts of the total weight of the molded product. Such additional material may be molding lubricants, dyes, pigments and inorganic cements.

The adhesiveness of the phenolic-wetted grits greatly assists in uniformly distributing the additional resin-forming condensate and the filler in spite of the difference in specific gravity between the grits and the filler. After thorough mixing which may occur in the same vessel in which the grits was initially wetted with the phenolic condensate, the mixture is introduced into molds and either cold pressed and subsequently baked to cure the resin or merely hot pressed such as at a pressure of 3000 to 5000 pounds per square inch at a temperature of 300–370° F. to effect curing of the resinous material.

Before introducing the composition into the mold, a sheet of fabric such as of heavy canvas or duck, preferably impregenated with a heat-reactive condensate such as of the phenolic type or of the amino-triazine type, may be laid at the bottom of the mold cavity and another such sheet at the top of the composition to provide facing layers upon the molded product. In addition, one or more sheets of such fabrics may be disposed within the body of the molded product so as to product a laminar structure. A preferred system provides a facing fabric impregenated with an amino-triazine resin on the back of such discs or wheels as are to be used for grinding such as for grinding weld beads and a fabric impregenated with a phenolic condensate is disposed on the face of such wheel. The phenolic face then is underneath the wheel during grinding action and must resist the tension produced in bending as the edge of the wheel is forced downwardly toward the work by the arbor. The amino-triazine-aldehyde condensate impregnated face undergoes less fraying which is an advantage on the lagging edge of the grinding wheel. In a cutting type of wheel, however, it is preferred to have both fabric facings impregnated with a phenolic because of the greater strength obtainable thereby. The fabric used for reinforcing the faces or as laminar reinforcement within the body of the wheel or other product may be made of glass, cotton, nylon, burlap or the like.

In general, the molded body of the abrasive product exclusive of fabric facing layers or internal laminar fabric insertions may contain from 50 to 85% grits, 12½ to 25% of thermosetting resin and 2½ to 25% filler, at least ⅕ of the resin being a phenolic type and at least 9/10 of the filler being a chopped rag filler.

The molded abrasive products may have any desired shape, discs or wheels being most common and useful. The abrasive grits or grains may be of any material such as alumina, emery, corundum, dense "regular" fused alumina, porous white fused alumina; silicon carbide and other hard carbides; quartz; glass, garnet; or diamonds. Two or more of these abrasives may be mixed, if desired. The ratio of resin to grits in the abrasive products may vary considerably depending upon whether a hard or soft wheel or disc is desired. The total resin should be at least 14.5 parts by weight per 100 parts of abrasive grits and it may be as high as 50 or more parts by weight per 100 parts of grits.

The following examples are illustrative of the invention and the parts therein are given in parts by weight unless otherwise noted.

*Example I*

Sixty parts of a 40-mesh aluminum oxide grits were mixed with 4 parts of a liquid phenolic condensation product derived from phenol and formaldehyde. Mixing was effected in a Troy mixer and was carried out until the grits were uniformly wetted. Thereafter, there were added 30 parts by weight of a mass comprising a chopped rag filler (cotton rags) impregnated with a liquid A-stage condensation product of formaldehyde and phenol, in which the ratio of the weight of condensate to the weight of the rag was 6:4. Mixing was continued until the impregnated rag and wetted grits were thoroughly intermingled. The mass was thereafter cold pressed at a pressure of 2500 pounds per square inch. The molded article was thereafter baked at 350° F. for a period of about 12 hours.

*Example II*

Sixty-three parts of alumina grits were mixed with 4 parts of a liquid phenolic condensation product derived from phenol and formaldehyde. Mixing was effected in a Troy mixer and was carried out until the grits were uniformly wetted. Thereafter, there was added 33 parts by weight of a chopped rag filler impregnated with a condensation product of formaldehyde with melamine and phenol in which the melamine and phenol are present in a ratio of 4:1 and the ratio of the weight of condensate to the weight of the rag which was of cotton was 1:1. Mixing was continued throughout the addition until the impregnated rag and wetted grits were thoroughly intermingled. Thereafter, the mixture was introduced into a mold adapted to produce a wheel 9/16 inch thick and nine inches in diameter. It was pressed at 2500 pounds per square inch for 5 minutes at 350° F.

*Example III*

A mixture was made as in Example II and introduced into a mold upon the bottom of which there was disposed a cotton duck fabric impregnated with a melamine-formaldehyde resin. Before closing the mold, a cotton duck impregnated with a phenolic A-stage condensate was introduced on top of the mass. Molding was effected as in Example II.

*Example IV*

A mixture produced as in Example II was introduced into a mold on the bottom of which a cotton duck impregnated with a liquid phenolic A-stage resin and after partially filling the mold, a glass fabric impregnated with a liquid phenolic A-stage resin was introduced upon the leveled charge, an additional charge was introduced and before closing the mold, a cotton duck fabric facing layer impregnated with a liquid phenolic A-stage resin was introduced. Molding was effected as in Example II in a period of 7 minutes at 350° F.

*Example V*

An abrasive wheel was made in accordance with the procedure of Example II except 58 parts by weight of grits were wetted with 3 parts by weight of the liquid phenolic and 39 parts by weight of the impregnated rag filler. Otherwise, the procedure was the same as in Example II.

*Example VI*

The procedure of Example II was carried out with 68 parts by weight of silicon carbide grits (220 grit size), 5 parts by weight of the liquid phenolic condensate and 27 parts by weight of the melamine-formaldehyde resin-impregnated rag filler.

The resulting products had high grinding ratios and flexural strengths and adequate impact strengths. For example, that of Example II had a flexural strength of 10,000 pounds per square inch as compared to strengths of 5000 to 7500 pounds per square inch in three grinding wheels now on the market of fiber- or fabric-reinforced phenolic type. The grinding ratio of the wheel of Example I was such that one gram of wheel was consumed for the removal of 4.31 inches of metal as compared to the removal of from 1.65 to 2.71 inches of metal per gram of the aforesaid three wheels. These grinding tests were performed upon a strip of mild steel (such as used in boiler plates) ¼ inch wide and the strip was ground away to a depth of ⅛ inch.

It is to be understood that changes and variations may be made without departing from the spirit and scope of the invention as defined in the appended claims.

We claim:

1. A method for producing a molded abrasive product comprising the steps of wetting abrasive grits with a liquid phenol-aldehyde condensate, thereafter mixing with the wetted grits a chopped rag filler impregnated with an amino-triazine-aldehyde precondensate, and hot pressing the mixture.

2. A method for producing a molded abrasive product comprising the steps of wetting abrasive grits with a liquid A-stage phenol-formaldehyde condensate, thereafter mixing a chopped rag filler impregnated with an amino-triazine-aldehyde condensation product with the wetted grits and pressing the mixture at an elevated temperature.

3. A method of producing a molded abrasive product comprising wetting 50 to 85 parts by weight of abrasive grits with from 1 to 6 parts by weight of a liquid A-stage phenol-aldehyde condensate, separately mixing 6½ to 24 parts by weight of an amino-triazine-aldehyde condensation product with a filler comprising at least 90% chopped rags, adding the chopped rags and the resin to the wetted abrasive grits and condensate, and pressing the resulting mixture at an elevated temperature.

4. In a method of producing molded abrasive products which consists of binding abrasive grits and a filler with a thermosetting resin, the improvement which comprises mixing the thermosetting resin condensate with a filler consisting of chopped rags, adding the grits to the condensate and filler, and pressing the resulting mixture at an elevated temperature.

5. The method of claim 4 wherein the chopped rag filler is a cellulosic material.

6. The method of claim 4 wherein the chopped rag filler comprises from 2½% to 25% by weight of the mixture.

7. The method of claim 4 wherein the chopped rag filler comprises pieces ranging from 1/25 of a square inch to one square inch in area and comprises from 2½% to 25% by weight of the mixture.

8. A pressure molded grinding wheel comprising abrasive grits, a phenol-aldehyde condensate encasing the grits, an amino-triazine-aldehyde condensate binder, and a chopped rag filler.

9. In a pressure molded grinding wheel which consists of abrasive grits, a thermosetting resin binder and a filler, the improvement which comprises haphazardly distributed pieces of chopped rag as the filler.

10. The article of claim 9 wherein the chopped rag filler is a cellulosic material.

11. The article of claim 9 wherein the chopped rag filler comprises from 2½% to 25% of the article.

12. The article of claim 9 wherein the chopped rag filler comprises pieces ranging from 1/25 of a square inch to one square inch in area and comprises from 2½% to 25% by weight of the article.

References Cited in the file of this patent

UNITED STATES PATENTS

| | | |
|---|---|---|
| 2,008,723 | Mills | July 23, 1935 |
| 2,076,517 | Robie | Apr. 6, 1937 |
| 2,215,380 | Swain et al. | Sept. 17, 1940 |
| 2,262,728 | Swain et al. | Nov. 11, 1941 |
| 2,397,101 | Goepfert et al. | May 26, 1946 |
| 2,412,599 | Buell | Dec. 17, 1946 |
| 2,413,729 | Rushner | Jan. 7, 1947 |
| 2,527,628 | Francis | Oct. 31, 1950 |